L. BLAKESLEE.
DISH DRIER.
APPLICATION FILED APR. 24, 1915.
1,176,697.
Patented Mar. 21, 1916.
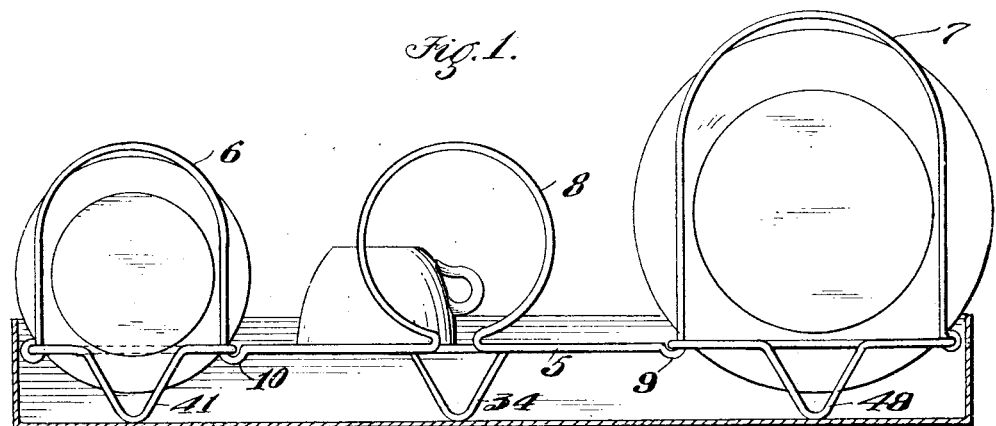
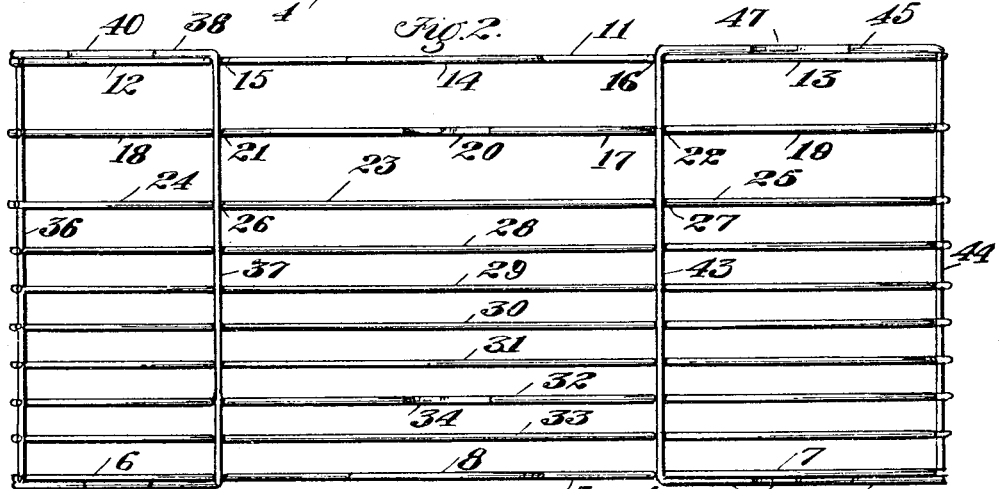
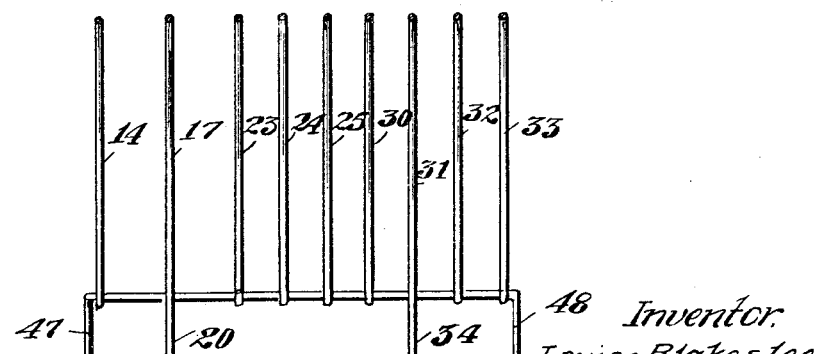
Inventor.
Louise Blakeslee.
by Edmund A. Strauss
Atty.

UNITED STATES PATENT OFFICE.

LOUISE BLAKESLEE, OF LOS ANGELES, CALIFORNIA, ASSIGNOR OF ONE-HALF TO PAUL R. HAZELTINE, OF LOS ANGELES, CALIFORNIA.

DISH-DRIER.

1,176,697.      Specification of Letters Patent.      Patented Mar. 21, 1916.

Application filed April 24, 1915. Serial No. 23,646.

*To all whom it may concern:*

Be it known that I, LOUISE BLAKESLEE, a citizen of the United States, residing at Los Angeles, in the county of Los Angeles and State of California, have invented new and useful Improvements in Dish-Driers, of which the following is a specification.

This invention relates to dish driers and the principal object is to provide a rack for holding dishes which will permit the exposure of substantially the entire surface of dishes, whereby they may be rinsed after washing by pouring boiling hot water over the dishes and will dry quickly due to the free circulation of air permitted.

It is another object of this invention to provide a rack which is light and portable and in which the dishes may be placed for rinsing, draining and drying, and which may be used as a carrier for the dishes in transporting them from the table or to the sideboard or other place where they are stored.

I attain these objects by means of the embodiment of my invention illustrated in the accompanying drawing, in which:

Figure 1 is an elevation showing dishes disposed in the drier. Fig. 2 is a plan view. Fig. 3 is an end elevation.

More specifically, 4 indicates a pan which is preferably of sheet metal and is rectangular in shape, and within which the drier is adapted to be placed.

The drier comprises a rack formed of resilient wire and includes a side wire 5 which has inverted U shaped loops 6 and 7 formed at its ends, and an intermediate loop 8 of substantially circular shape. Loops 6 and 7 are of different dimensions and serve as standards to hold dishes of various sizes. The inner legs of standards 6 and 7 are bent at their lower ends as indicated at 9 and 10 to form a semi-circular loop which will partially encompass a wire.

A wire 11 having end loops 12 and 13 and an intermediate loop 14 similarly disposed and of the same size and shape as loops 6, 7 and 8 respectively is provided to form a side member of the rack. Wire 11 is also provided with small loops 15 and 16 similar to loops 9 and 10 of wire 5.

Disposed adjacent wire 11 is a wire 17 provided with standards 18 and 19 similarly disposed and of substantially the same shape as standards 6 and 7 respectively of wire 5. Intermediate standards 18 and 19 a portion of the wire 17 is bent downwardly to form a leg 20 of V shape. Loops 21 and 22 similar to loops 9 and 10 of wire 5 are formed at the bottom of the inner legs of standards 18 and 19.

A wire 23 is formed with standards 24 and 25 of substantially the same shape and form as standards 6 and 7 and with small loops 26 and 27 of the same size and shape as loops 9 and 10. Wires 28, 29, 30, 31 and 33 are formed with loops similar to wire 23. Wire 32 is formed with loops similar to wire 17 and is provided with a leg 34.

A wire 35 is bent into the shape of a rectangle having long sides 36 and 37 and short sides 38 and 39. In the sides 38 and 39 a bend of substantially V form is made to form legs 40 and 41. The length of sides 38 and 39 is just sufficient to span the small dish standards.

Another wire 42 is bent in the form of a rectangle having long sides 43 and 44 and short sides 45 and 46, the sides 45 and 46 being of a length sufficient to span the large dish standards. In the sides 45 and 46 V shaped bends 47 and 48 are made to form legs.

The wire 35 is positioned with side 37 in the small loops adjacent the small dish standards and the side 43 of the wire 42 is positioned in the small loops adjacent the large dish standards. The ends of wires 11, 17, 24, 28, 29, 30, 31, 32, 33 and 5 are bent about the sides 36 and 44 of wires 35 and 42 and are spaced from each other at intervals which are preferably not uniform. The wires are fixedly secured to each other by any well known means such as soldering, brazing or welding.

The drier is placed in the pan 4 and the dishes as they are washed are placed in the rack between the standards, the different spacing and size of standards accommodating different size dishes. Flat dishes are placed between adjacent dish standards with their rims resting upon the members 36, 37, 43 and 44. Dishes of irregular form such as cups are placed upon the platform formed between the dish standards. Hot water is now poured over the dishes, the superfluous water draining into the pan. The dishes are allowed to remain for a time in the rack where they dry quickly due to the large surface exposed to the atmosphere.

What I claim is:

1. A dish drier comprising spaced wires looped upwardly at the ends in inverted U shape to form dish standards, said dish standards arranged in two groups, one group at each end, said groups being spaced thereby forming a table, each side wire having a substantially circular upstanding loop formed intermediate of the end loops, and cross wires secured transversely to the legs of the dish standard bent parallel to the plane of the dish standard and bowed downwardly in the same plane to form supporting feet.

2. A dish drier comprising spaced wires looped upwardly at the ends in inverted U-shape to form dish standards, said dish standards arranged in two groups, one group at each end, said groups being spaced thereby forming a table, each side wire having a substantially circular upstanding loop formed intermediate of the end loops, wires intermediate of said side wires bowed downwardly to form supporting feet, and cross wires secured transversely to the legs of the dish standards bent parallel to the plane of the dish standards and bowed downwardly in the same plane to form supporting feet.

In witness that I claim the foregoing I have hereunto subscribed my name this 27th day of March, 1915.

LOUISE BLAKESLEE.